(12) United States Patent
Trifilo

(10) Patent No.: US 7,038,421 B2
(45) Date of Patent: May 2, 2006

(54) METHOD AND SYSTEM FOR MULTIPLE SERVO MOTOR CONTROL

(75) Inventor: Timothy M. Trifilo, Walden, NY (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 10/465,484

(22) Filed: Jun. 17, 2003

(65) Prior Publication Data

US 2004/0257022 A1 Dec. 23, 2004

(51) Int. Cl.
G05B 11/32 (2006.01)

(52) U.S. Cl. .................. 318/625; 318/111; 318/112; 318/113; 318/560; 318/562

(58) Field of Classification Search ........ 318/111–113, 318/560–625
See application file for complete search history.

(56) References Cited

U.S. PATENT DOCUMENTS

| 4,289,997 A * | 9/1981 | Jung et al. ............. 318/113 |
| 4,296,361 A * | 10/1981 | Archer .................. 318/54 |
| 4,614,901 A * | 9/1986 | Kullman et al. ........... 318/99 |
| 4,647,824 A * | 3/1987 | Eichenwald ............. 318/71 |
| 4,670,693 A * | 6/1987 | Kazami et al. ........... 318/112 |
| 4,760,521 A | 7/1988 | Rehwald et al. .......... 364/200 |
| 4,873,476 A | 10/1989 | Kurakake et al. ........ 318/568.22 |
| 5,202,611 A * | 4/1993 | Uehara et al. ............ 318/85 |
| 5,315,218 A * | 5/1994 | Fortune et al. .......... 318/54 |
| 5,455,495 A * | 10/1995 | Bec ..................... 318/560 |
| 5,630,165 A | 5/1997 | Asghar et al. ........... 395/800 |
| 5,771,393 A | 6/1998 | Asghar et al. ........... 395/821 |
| 6,583,591 B1 * | 6/2003 | Echols et al. ........... 318/112 |

* cited by examiner

Primary Examiner—Marlon T. Fletcher
Assistant Examiner—Tyrone Smith
(74) Attorney, Agent, or Firm—Lily Neff; Cantor Colburn LLP

(57) ABSTRACT

A system for control of a plurality of motors comprising: an inverter including at least three legs, with each leg including two series switching devices configured to receive a command from a controller. The system also includes a first motor operably connected to an inverter at a common terminal of the switching devices for a first leg and at a common terminal of the switching devices for a second leg; a second motor is operably connected to the inverter at the common terminal of the switching devices for the second leg and at a common terminal of the switching devices for a third leg. The outer terminals of the switching devices for each of the first leg, second leg and third leg are operably connected to the voltage source. The controller executes a process for controlling the first motor and the second motor with an error arbiter function.

16 Claims, 4 Drawing Sheets

METHOD AND SYSTEM FOR MULTIPLE SERVO MOTOR CONTROL

FIELD OF THE INVENTION

This invention relates to full bridge motor controllers. More particularly, applications providing control for multiple motors.

BACKGROUND

Full bridge motor controllers are well known in the art. Generally a full bridge motor controller employs four discrete power switching devices (usually transistors) for each motor controlled. The switching devices often controlled by a controller or processor.

When a system utilizes multiple motors, multiple full bridge motor controllers are necessary to control each motor. Unfortunately this requires significant space, expense, and the like. What is needed is a multiple motor control system that provides full bridge capability with reduced componentry and space.

BRIEF SUMMARY OF AN EXEMPLARY EMBODIMENT

Disclosed herein in an exemplary embodiment is A system for control of a plurality of motors comprising: an inverter including at least three legs, with each leg including two series switching devices configured to receive a command from a controller, wherein the inverter is in operable communication with a voltage source and a controller. The system also includes a first motor operably connected to an inverter at a common terminal of the switching devices for a first leg and at a common terminal of the switching devices for a second leg; a second motor is operably connected to the inverter at the common terminal of the switching devices for the second leg and at a common terminal of the switching devices for a third leg. The outer terminals of the switching devices for each of the first leg, second leg and third leg are operably connected to the voltage source. The control terminals for the switching devices are in operable communication with the controller and each switching device is responsive to a command therefrom. The controller executes a process for controlling the first motor and the second motor with an error arbiter function.

Also disclosed herein in another exemplary embodiment is a method for controlling a plurality of motors comprising: receiving a first signal indicative of a first parameter for a first motor; receiving a first command indicative of a desired value for the first parameter for the first motor; determining a first error associated with the first parameter; receiving a second signal indicative of a second parameter for a second motor; receiving a second command indicative of a desired value for the second parameter for the second motor; determining a second error associated with the second parameter; and multiplexing operation of the first motor and the second motor.

Disclosed herein in yet another exemplary embodiment is a storage medium encoded with a machine-readable computer program code, the code including instructions for causing a computer to implement the above mentioned method for controlling a plurality of motors.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example with reference to the drawings.

DETAILED DESCRIPTION OF THE EXEMPLARY EMBODIMENTS

Disclosed herein in an exemplary embodiment is an apparatus and methodology that reduces the componentry required to implement a plurality of full bridge controllers for applications where multiple motors are controlled. Advantageously, an embodiment of the invention solves a problem exhibited by existing full bridge motor controllers requiring four discrete power transistors for each motor controlled. Moreover, yet another advantage of an exemplary embodiment is that it controls multiple motors with a common H-bridge leg (switching device), thereby saving the need for two switching devices per motor. For applications where real-time performance is not mandated, the embodiments disclosed herein provide a highly cost effective solution. In addition, it will be appreciated that while an embodiment of the invention is described herein with respect to a two motor implementation and solution, the invention is readily expandable to more than two motors for an even greater savings of parts, space, and design complexity. For example, multi-axis robotic manipulators that employ several servo motors may readily benefit from the disclosed embodiments herein.

Figure 1:
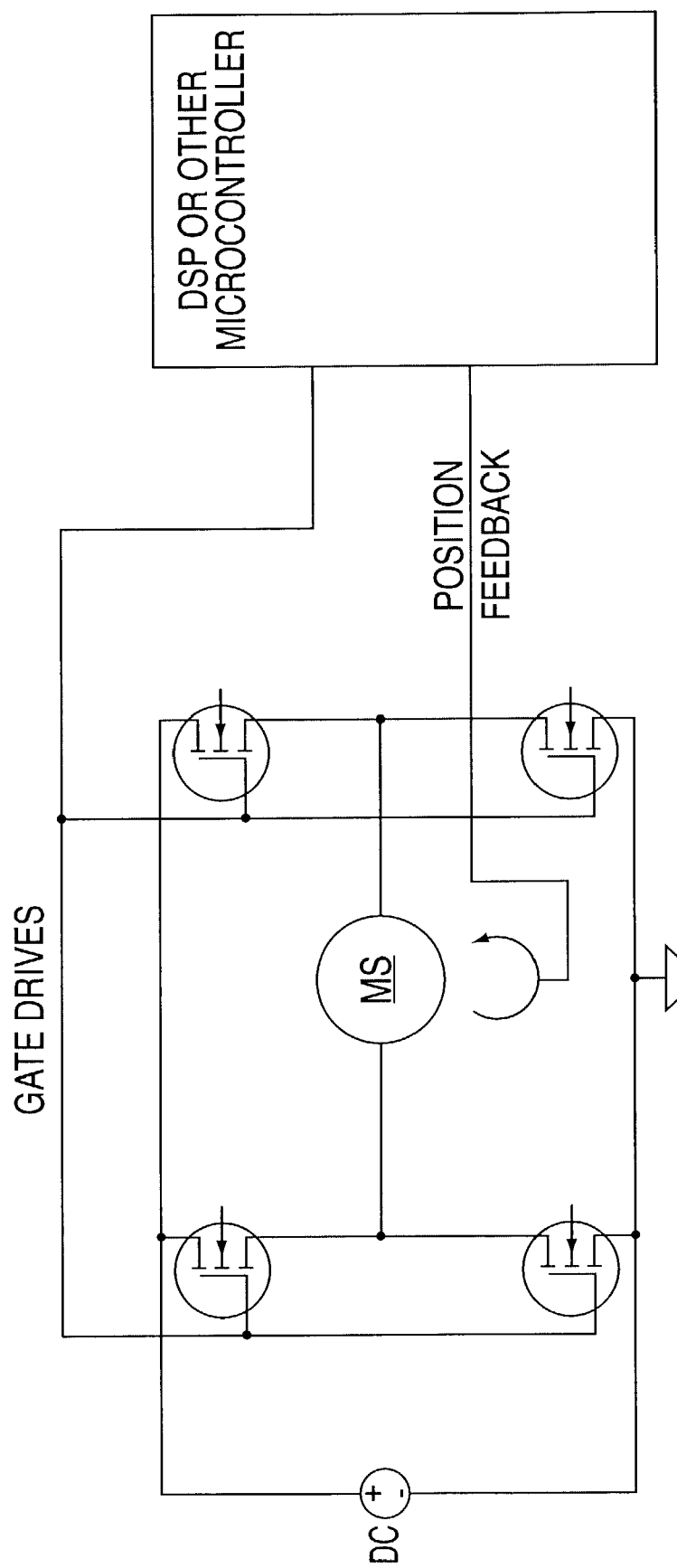
FIG. 1 depicts an existing full bridge motor control system.

First it may be beneficial to consider the operation of existing full bridge motor controllers. Referring to FIG. 1, an existing full bridge motor control system is depicted. A typical full bridge motor controller includes a motor coupled to an inverter also known as a power controller and the like. The inverter in this instances includes two legs with each leg comprising field effect transistors (FET). The common terminals of the switching devices for each leg are tied to the motor, while the outer terminals are tied to a voltage source. The gates of the FET's receive a control command from a controller to control when each of the switching devices is enabled.

Figure 2:
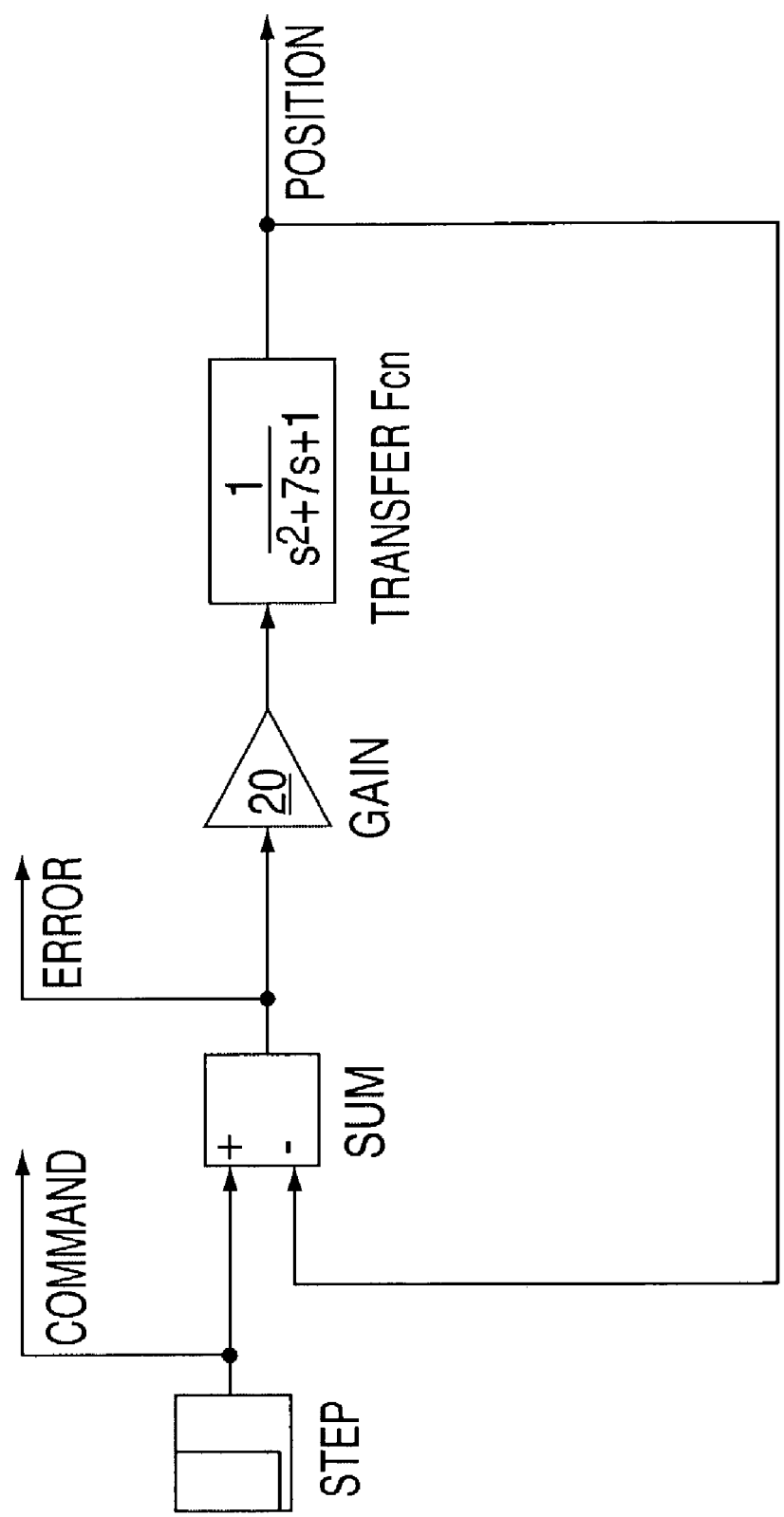
FIG. 2 depicts a simplified block diagram for an existing control methodology.

Referring now to FIG. 2 as well, a simplified block diagram for an existing control methodology is depicted. There are three basic types of servo systems: 1.) Position, (most common); 2.) Velocity (e.g., cruise control); 3.) Acceleration. For discussion and simplicity, a focus on a position control methodology is provided, as this is the most common for industrial automation.

Figure 3:
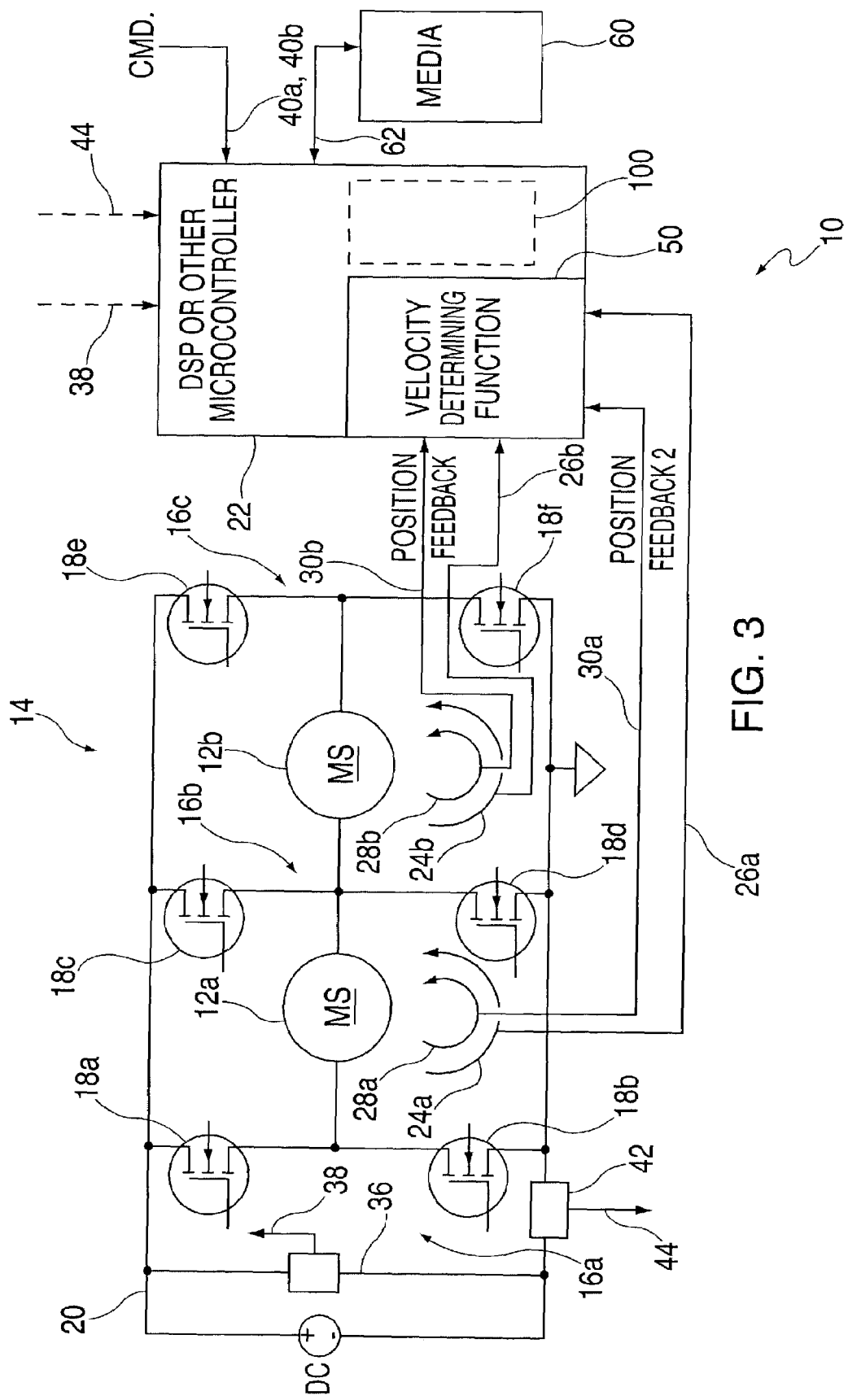
FIG. 3 depicts a block diagram of an illustrative motor controller in accordance with an exemplary embodiment.

A position servo system is a classic single-input single-output control. For a simple case, a position encoder is used to create an analog voltage proportional to position. A basic servo system controller with position feedback is shown below for a single motor and single command signal with no external disturbances: An illustrative response of such a system is shown in FIG. 3. While this response seems slow, the above example is derived from a ⅕th scale remote control car, with the unit step representing a full range of steering from "max right" to "max left".

This type of response is typical for real world systems with high torque requirements.

Referring now to FIG. 3 a block diagram of an illustrative dual motor controller 10 in accordance with an exemplary embodiment is depicted. In an embodiment of the invention a full bridge motor controller 10 for two motors 12 is provided. However, unlike existing motor controllers, in this instance of an exemplary embodiment, only six switching devices (instead of eight) are needed for control of two motors. The full bridge motor controller 10 includes two motors 12a and 12b coupled to an inverter apparatus 14 also known as a power controller, and the like. The inverter 14 in this instance includes three legs shown generally as first leg 16a, second leg 16b, and third leg 16c with each leg 16a, 16b, and 16c comprising two series switching devices 18a–18f for each leg 16b, and 16c respectively. In an exemplary embodiment a field effect transistors (FET) is employed as the switching devices 18a–18f. However, it will be appreciated that the switching devices 18 may be transistors, junction transistors, Field Effect transistors (FETs), Insulated Gate Bipolar Transistors (IGBTs), Silicon Controlled Rectifiers (SCR), and Triacs solid state relays and the like, as well as combinations including at least one of the foregoing.

Continuing with FIG. 3, in an exemplary embodiment, the common terminals of the switching devices for legs 18a and 18c are tied to one terminal of the motors 12a and 12b respectively, while the outer terminals are tied to a voltage source 20. The common terminals of the switching devices for leg 18b are tied to a terminal for both motors 12a and 12b respectively. The control input for the switching devices (e.g., gates of the FET's) are operably connected (not shown in the figure for clarity) to a controller 22 and receive a control command from a controller to control when each of the switching devices 18a–18f is enabled.

The controller 22 is employed to develop the correct voltage needed to produce the desired torque, position, and/or speed of the motors 12a and 12b. In order to perform the prescribed functions and desired processing, as well as the computations therefore (e.g., the control algorithm(s), and the like), the controller 22 may include, but not be limited to, a processor(s), computer(s), memory, storage, register(s), timing, interrupt(s), communication interface(s), and input/output signal interfaces, and the like, as well as combinations comprising at least one of the foregoing. For example, controller 22 may include signal input signal filtering to enable accurate sampling and conversion or acquisitions of such signals from communications interfaces. It should also be appreciated that while in an exemplary embodiment the inverter apparatus 14, switching devices 18a–18f, and controller 22 are described as separate, in some embodiments, it may desirable to have them integrated as a single component. Additional features of controller 22 are thoroughly discussed at a later point herein.

Optional motor velocity sensors 24a and 24b are connected to the motors 12a and 12b respectively to detect the angular velocity of the motor(s). The velocity sensor(s) 24a, 24b, may sense the velocity based on optical detection or magnetic field variations, and the like. The velocity sensor(s) 24a, 24b output velocity signals 26a and 26b respectively indicating the angular velocity of the motors 12a and 12b respectively.

Alternatively, optional position sensors may be employed to determine the position of the motor(s) 12a and 12b. The optional motor position sensors 28a and 28b are connected to the motors 12a and 12b respectively, to detect the angular position of the motors 12a and 12b. The position sensors 28a and 28b may sense the position based on optical detection or magnetic field variations, and the like. The position sensors 28a and 28b output position signals 30a and 30b respectively, indicating the angular position of the motors 12a and 12b.

The optional position signals 28a and 28b, may be applied to a velocity determining function 50 or process to determine the velocity of the motors 12a and 12b. The function 50 may, for example, include a counter that counts position signal pulses (for a position encoder) for a predetermined duration. The count value is proportional to the speed of the motor. For example, if a counter counts the position signal pulses in time intervals of 5 milliseconds and the encoder has a resolution of 2.5 degree, the speed measurement will have a resolution of about 41.7 rpm. The speed signal 24 may also be obtained as the derivative of the position signal 26 from the equation $\omega_m = \Delta\theta_m/\Delta t$ where $\Delta t$ is the sampling time and $\Delta\theta_m$ is the change in position during a sampling interval. This process is a method of extracting a digital, derived velocity value based on a per sample period of change of the position signals 28a and 28b. The process computes the velocity signal by determining a delta position computed by subtracting the position signal delayed by one sample from the current position signal value. That is, subtracting the last sampled or measured position from the current position. The position difference is then divided by the difference in time between the two samples. An equation illustrating the computation is as follows:

$$\text{Delta} = \frac{P_0 - P_{-1}}{T_0 - T_{-1}}$$

In an exemplary embodiment of the above equation evaluates a changing measured position over a fixed interval of time to perform the computation. It will be appreciated by those skilled in the art, that the computation may be performed with several variations. An alternative embodiment, evaluates a changing measured time interval for a fixed position change to perform the computation. Further, in yet another embodiment, both the interval of time and interval position could be measured and compared with neither of the parameters occurring at a fixed interval. In another exemplary embodiment a filter further processes the calculated velocity value. Where the filtering characteristics are selected and determined such that the filter yields a response sufficiently representative of the true velocity of the motors 12a and 12b without adding excessive delay. One skilled in the art will appreciate and understand that there can be numerous combinations, configurations, and topologies of filters that can satisfy such requirements. An exemplary embodiment may employ a four-state moving average filter.

Continuing with FIG. 3, the power source 20 e.g., a DC voltage supply bus, is optionally sensed with a bus sensor 36 and an optional bus voltage signal 38 is transmitted to the controller 20. In an exemplary embodiment the bus sensor 36 comprises two series resistors in a voltage divider applied across the power source 20. The divided voltage signal therefrom forming the bus voltage signal 38. It will be appreciated that other circuit configurations for sensing the bus voltage of the power source 16 are possible. The system 10 may also include an optional current sensor 42 for sensing the total motor current and transmitting a current signal 44 to the controller 22.

The optional position signals 30*a* and 30*b*, and/or optional speed signals 26*a* and 26*b*, optional bus voltage signal 38, optional current signal 44, and an optional command signal 40 are applied to the controller 22. The command signal 40*a*, 40*b* is indicative of the desired motor torque, position, speed and the like for each of the motors 12*a* and 12*b* respectively. It will be appreciated that while the desired command signal 40*a* and 40*b* are depicted in an exemplary embodiment as external to the controller 22, the command signal(s) 40*a* and 40*b* could also be generated internal in response to various inputs. The controller 22 determines gate drive commands (control commands to the switching devices 18*a*–18*f*) to develop the desired torque, position speed using the signals 30*a* and 30*b*, 26*a* and 26*b*, 38, 40*a* and 40*b*, and 44, and other fixed motor parameter values. Gate drive command signals of the controller 22 are applied to the inverter 14 (switching devices 18*a*–18*f*) that is coupled with the power source or bus 20 to apply voltage to the windings of the motors 12*a* and 12*b*.

Figure 4:
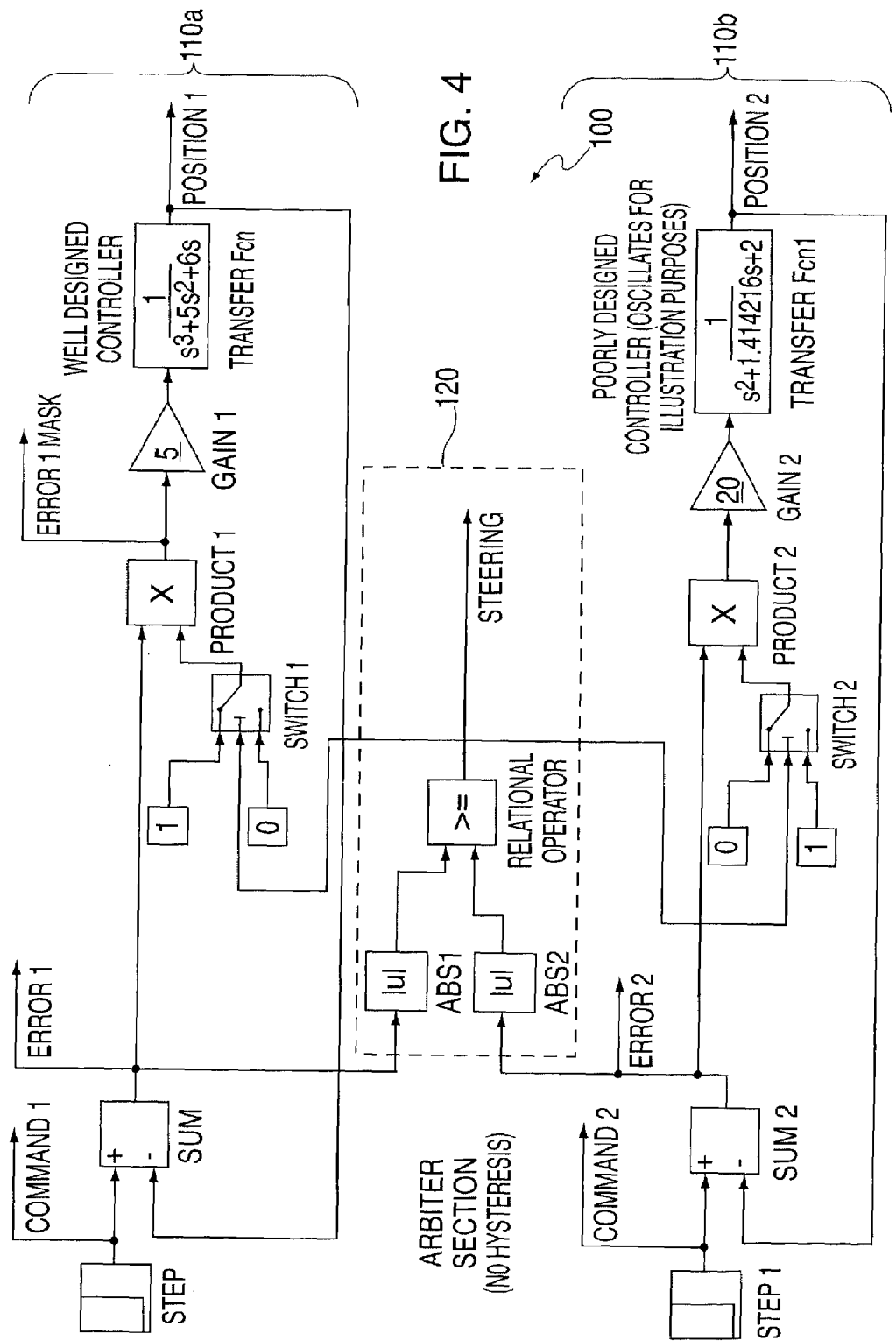
FIG. 4 depicts a simplified block diagram of a motor control methodology in accordance with an exemplary embodiment.

In an exemplary embodiment, the operation of the inverter apparatus is time shared between the two motors 12*a* and 12*b* to affect the control requirements thereof. Referring now to FIG. 4, a simplified block diagram of a motor control methodology 100 of an exemplary embodiment. The methodology 100 includes a motor control process 110*a* and 110*b* for each motor employed 12*a* and 12*b* respectively. The methodology also includes an error signal arbiter function 120 to facilitate control of the switching devices 18*a*–18*f*. The error signal arbiter function 120 may be implemented with hardware, or realized as microcode, code, and the like and enables the "common" bridge leg 16*b* to be "shared" in an efficient means, thereby minimizing any time multiplexed drive effect on the control of the two motors 12*a* and 12*b*. The error arbiter function 120 may operate in a number of modes. For example, a simple round-robin type time sharing may be employed, or time sharing based on error signal magnitude with a hysteresis band may be employed. It will be appreciated that because the motor control processes 110*a* and 110*b* are implemented on a time multiplexed basis, the control algorithms employed for an existing full bridge controller may need to be modified to maintain equivalent motor control response. Advantageously it will also be appreciated that by utilizing a voltage source 20 exhibiting a higher bus voltage, speed and position response for the motors 12*a* and 12*b* of an exemplary embodiment may readily be achieved that reproduce those exhibited in a motor control system with dedicated bridge (e.g. four transistors) for each motor with no loss in performance. Moreover, yet another advantage of the motor control methodology disclosed herein in an exemplary embodiment is that it may readily be implemented with software alone, requiring minimal hardware modification. This means that in a particular implementation of the controller 22 could control five motors instead of just three. Moreover, compared to existing motor controllers, the motor control system 10 of an exemplary embodiment results in a savings of approximately 4 square inches of board area as well as reduced cost based on the reduced parts count. In other words, the controller 22 of an exemplary embodiment could be employed to drive two servo motors e.g., 12*a* and 12*b*, instead of one with an overall decrease of 25 percent of the cost and area. Continuing with FIG. 4, in an exemplary embodiment of the motor control methodology 100 a sharing function may be implemented by masking an error signal for one motor controller e.g. 110*a*, while the magnitude of the error signal for the other motor controller e.g., 110*b* is greater. It will be appreciated that the methodology depicted in figure for depicts an illustrative model for algorithms for controlling the motor control system 10 of an exemplary embodiment, other configurations are readily envisioned. In addition, features such as error detection, diagnostics, dead time, or hysteresis and the like, as well as combinations including at least one of the foregoing may be employed. For example, for simplicity, there is no hysteresis employed in the above system, yet hysteresis may readily be employed.

Two servo motor control processes 110*a* and 110*b* are depicted. It will be appreciated that only one may be active at a time in an exemplary embodiment, the motor control process suffering from the larger error is awarded priority. The error signal arbiter function 120 is used to determine and select the motor control process e.g., 110*a* or 110*b* that acquires control of the inverter at any given time. Because the motor control process e.g., 110*a* or 110*b* with the greatest error is given priority, as would be expected, responses for each of the control processes 110*a* and 110*b* are only half as fast as would result if exclusive access to the inverter was allowed. Advantageously, the responses may readily be maintained by using higher gain in the control processes 110*a* and 110*b*, or a higher voltage for the DC bus supply 20 provided of course, that the motors 12*a* and 12*b* are configured to tolerate an elevated voltage.

Another feature of an exemplary embodiment is that while one motor e.g. 12*a* is active, for example by activating switching devices 18*a* and 18*d* the other switching devices 18*b*, 18*c*, 18*e*, and 18*f* may either be inactive (off) or used to implement a feature called active breaking. It will be appreciated that if both switching devices e.g. 18*e* and 18*f* for the unused motor 12*b* in this example, are inactive, no current flows, but the rotor of the motor 12*b* can spin freely. In yet another exemplary embodiment of the invention active braking is provided to facilitate maintaining the current position of the inactive motor (12*b* in this instance). For illustration, if the common bottom switching device 18*d* is active (on), then the unused bottom switching device 18*f* is also activated (turned on). Such a configuration for the inverter 14 "plugs" the motor 12*b*, shorting its back-EMF and thereby, creating resistance to free rotation. It will be appreciated that similar arrangement may be made for the "upper" switching devices e.g. 18*c* and 18*e* in this instance. It will be appreciated, that the controller functionality described herein is for illustrative purposes. The processing performed throughout the system may be distributed in a variety of manners. For example, distributing the-processing performed in the controller 20 among the other controllers, and/or processes employed may eliminate a need for such a component or process as described. Each of the elements of the systems described herein may have additional functionality as described in more detail herein as well as include functionality and processing ancillary to the disclosed embodiments. As used herein, signal connections may physically take any form capable of transferring a signal, including, but not limited to, electrical, optical, or radio. Moreover, conventional torque, position, and/or velocity control of a motor may utilize a feedback control system to regulate or track to a desired torque, position, and/or velocity. The control law maybe a proportional, integral or derivative gain on the tracking error or may be a more sophisticated higher-order dynamic. In either case, the feedback measurement may be estimated or an actual position/velocity and in some cases, it's derivatives.

The system and methodology described in the numerous embodiments hereinbefore provides a robust apparatus and methodology to control a plurality of motors with reduced componentry. In addition, the disclosed invention may be embodied in the form of computer-implemented processes and apparatuses for practicing those processes. The present invention can also be embodied in the form of computer program code containing instructions embodied in tangible media 60, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal 62 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for control of a plurality of motors comprising:
    an inverter comprising at least three legs including a first leg, a second leg, and third leg, with each leg comprising two series switching devices configured to receive a command from a controller; wherein said inverter is in operable communication with a voltage source and a controller;
    a first motor operably connected to an inverter at a common terminal of said
        switching devices for said first leg and at a common terminal of said switching devices for said second leg;
    a second motor operably connected to said inverter at said common terminal of said switching devices for maid second leg and at a common tenninal of said switching devices for said third leg;
    wherein outer terminals of said switching devices for each of said first leg, said second leg and said third leg are operably connected to said voltage source; and
    wherein control terminals for said switching devices are in operable communication with maid controller and each switching device is responsive to a command therefrom, said controller executing a process for controlling said first motor and said second motor wit an error arbiter function.

2. The system of claim 1 further including a velocity sensor in. operable communication with at least one of said first motor and said second motor, said velocity sensor transmitting a velocity signal to said controller indicative of a velocity of at least one of said first motor and said second motor, wherein said command is further responsive to said velocity signal.

3. The system of claim 1 further including a position sensor in operable communication with at least one of said first motor and said second motor, said position sensor tmnsmitting a position signal to said controller indicative of a position of at least one of said first motor and said second motor, wherein said command is further responsive to at least one of said position signal and a velocity value computed therefrom.

4. The system of claim 1 farther including a current sensor in operable communication with at least one of said first motor, said second motor, and said inverter, said current sensor transmitting a current signal to said controller indicative of a current utilized by at least one of said first motor and said second motor, wherein said command is further responsive to said current signal.

5. The system of claim 1 wherein said switching devices comprise at least one of trasistors, junction transistors, Field Effect transistors (PETs), Insulated Gate Bipolar Transistors (IGBTs), Silicon Controlled Rectifiers (SOR), and Triacs solid state relays.

6. The system of claim 1 wherein said motor comprises a DC brush type servo motor.

7. The system of claim 1 wherein said voltage source comprises at least one of an AC voltage source and a DC voltage source.

8. A method for controlling a plurality of motors comprising:
    receiving a first signal indicative of a first parameter for a first motor;
    receiving a first command indicative of a desired value for said first parameter for said first motor;
    determining a first error associated with said first parameter;
    receiving a second signal indicative of a second parameter for a second motor;
    receiving a second command indicative of a desired value for said second parameter for said second motor;
    determining a second error associated with said second parameter;
    multiplexing operation of said first motor and said second motor; and
    comparing said first error and said second error with an error arbiter function.

9. The method of claim 8 wherein said multiplexing is based on said error arbiter function.

10. The method of claim 8 wherein said multiplexing is based on time sharing control of said first motor and said second motor.

11. The method of claim 8 wherein said multiplexing is based a magnitude of said first error and said second error.

12. The method of claim 8 wherein said first parameter includes at least one of position, a velocity and a current.

13. The method of claim 8 wherein said second parameter includes at least one of a position, a velocity and a current.

14. The method of claim 8 wherein said activating includes a first motor control process responsive to at least one of said first signal, said first command, end said first error.

15. The method of claim 8 wherein said activating includes a second motor control process responsive to at least one of said second signal, said second command, and said second error.

16. A method for controlling a plurality of motor comprising:
   receiving a first signal indicative of a first parameter for a first motor;
   receiving a first command indicative of a desired value for said first parameter for said first motor;
   determining a first error associated with said first parameter;
   receiving a second signal indicative of a second parameter for a second motor;
   receiving a second command indicative of a desired value for said second parameter for said second motor;
   determining a second error associated with said second parameter;
   multiplexing operation of said first motor and said second motor; and
   increasing a voltage of a voltage source when employing said error arbiter function to maintain response times for at least one of said first motor and said second motor.

* * * * *